March 5, 1946. W. C. GARDINER 2,396,171
ELECTROLYSIS OF MAGNESIUM CHLORIDE FUSIONS
Filed June 11, 1942
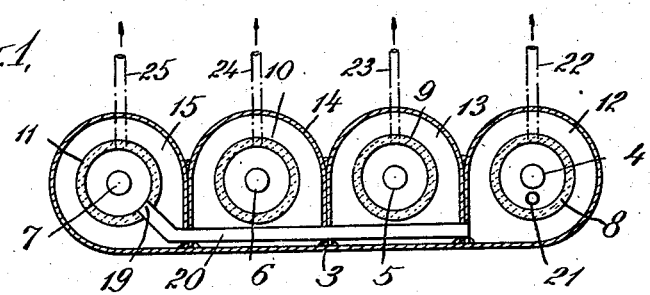
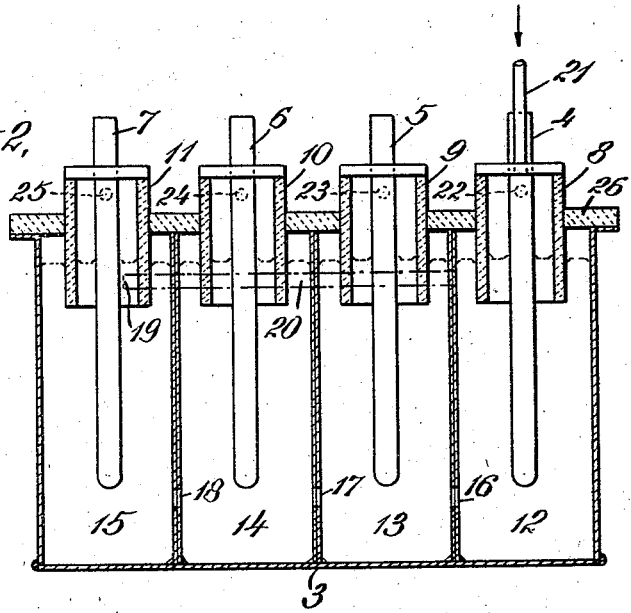
INVENTOR
William C. Gardiner
BY
Pennie, Davis, Marvin + Edmonds
ATTORNEYS Patented Mar. 5, 1946

2,396,171

UNITED STATES PATENT OFFICE 2,396,171

ELECTROLYSIS OF MAGNESIUM CHLORIDE FUSIONS

William C. Gardiner, Niagara Falls, N. Y., assignor to The Mathieson Alkali Works, Inc., New York, N. Y., a corporation of Virginia Application June 11, 1942, Serial No. 446,558

1 Claim. (Cl. 204—70)

My invention relates to improvements in the recovery of chlorine in the electrolysis of magnesium chloride fusions, to produce magnesium metal, in which hydrous magnesium chloride is introduced into the electrolyte in the presence of anodic chlorine.

Originally, the electrolytic production of magnesium from the fused chloride required the production of anhydrous magnesium chloride as charging material. The anhydrous salt can be produced by chlorinating magnesia in the presence of carbon, but large and low cost supplies of magnesium chloride are also available as aqueous solutions or brines. However, when hydrous salts crystallized from such solutions, $MgCl_2.6H_2O$ for example, are subjected to dehydration in any ordinary manner, the salt tends to decompose with formation of magnesium oxide and hydrochloric acid.

To suppress such decomposition it was proposed, about twenty years ago, to introduce the hydrous make-up salt, dehydrated to a point short of that at which such decomposition became serious, into the fused electrolyte in the vicinity of the anodes and thus in the presence of the anodic chlorine initially liberated by the electrolysis and to include a small proportion of carbon with the salt so introduced. In practical application, this proposal has proved effective with respect to magnesium production and a failure with respect to chlorine production, chlorine being the concomitant product of the electrolysis.

The chlorine produced by the electrolysis of the magnesium chloride fusion is liberated at the anode. When the hydrous salt is introduced into the fused electrolyte in the vicinity of the anode, the liberated water vapor reacts with the liberated chlorine, the prevailing temperature usually approximating 700°–850° C., to form hydrochloric acid.

The escaping gas mixture, in such practice, thus contains hydrochloric acid and water vapor as well as chlorine plus air present either because of leakage or because of introduction to cool refractories, electrodes, etc., and the concentration of chlorine is usually very low, frequently being but 1% or 2% and sometimes approaching zero. The recovery of the chlorine present as such from such gas mixtures has hitherto been impractical and the recovery as chlorine of that potentially available in the form of hydrochloric acid has been uneconomic.

When the production of magnesium chloride for the electrolysis involves the utilization of hydrochloric acid, for example to dissolve magnesium hydroxide precipitated from sea water or other brine, some sort of balance may be approximated by using the gas mixture escaping from the electrolysis as the source of such hydrochloric acid, but when the chloride is available as such, for example by carbonation of slurries of mixed oxides produced by calcination of dolomite in calcium chloride liquors, the production of such gas mixtures imposes a serious economic burden on the overall operation, considered either as a problem of disposal or as a waste of a valuable material, chlorine.

A substantial part of the chlorine initially liberated by the electrolysis can be recovered as such by introducing the hydrous salt into the fusion in the vicinity of some but not all of the anodes in a cell provided with a plurality of anodes and separately collecting the gas mixture including water vapor and hydrochloric acid formed in the vicinity of such anodes and the chlorine liberated at the other anodes. However, some of the magnesium chloride thus incorporated into the fusion remains as a basic magnesium chloride which reacts as the equivalent of water. Decomposition of such basic chloride in the region of electrolysis impairs the efficiency of the operation, consumes magnesium chloride in formation of magnesium oxide and liberates hydrochloric acid which contaminates the chlorine liberated by the electrolysis. Thus, chlorine separately collected in this manner also usually contains some hydrochloric acid.

I have now devised an electrolysis to which make-up salt is supplied as hydrous magnesium chloride, in which only a minor part of the chlorine liberated by the electrolysis is consumed in suppressing decomposition of the magnesium chloride, and in which chlorine contaminated with hydrochloric acid produced by decomposition of basic magnesium chloride is segregated from uncontaminated chlorine. The electrolysis and the recovery of chlorine as such are thus improved, in efficiency and in economy.

According to my invention, at least three segregated bodies of the magnesium chloride fusion are subjected to electrolysis, the fusion is cyclically circulated through these several bodies, the hydrous make-up magnesium chloride is introduced in the fusion in the presence of the anodic chlorine liberated by the electrolysis of one of the bodies, a gas mixture including water vapor and hydrochloric acid is taken off the body into which the hydrous salt is introduced, a gas mixture consisting essentially of chlorine is taken off from the body from which the fusion is circulating to the body into which the hydrous salt is introduced, and a gas mixture containing less hydrochloric acid than the first mentioned gas mixture, hydrochloric acid produced by decomposition of basic magnesium chloride, is taken off from an intermediate body through which the fusion is circulating from the body into which the hydrous salt is introduced to the body from which a gas mixture consisting essentially of chlorine is taken off. Thus, the gas mixture produced by the primary dehydration is separately collected, the chlorine substantially free from contamination is separately collected facilitating recovery, and the gas mixture comprising chlorine and contaminating hydrochloric acid is separately collected for appropriate special treatment. The number of segregated bodies in the cycle of circulation may number from three to six or more for example. The hydrous magnesium chloride is with advantage introduced as a mixture containing a small proportion, from about 1% to about 5% for example, of carbon. Usually from 10% to 20% of the chlorine initially liberated by the electrolysis will suffice effectively to suppress decomposition other than that producing a small amount of basic magnesium chloride during the primary dehydration; thus for example the hydrous make-up salt can be introduced into the fusion in one body of a group of from three to six bodies. The decomposition of residual basic magnesium chloride will usually be substantially complete in the succeeding body, or sometimes two bodies in larger groups, and a gas mixture consisting essentially of chlorine can be collected for direct recovery as such from the remaining bodies of the group. The several bodies of the fusion subjected to electrolysis may be arranged within a single subdivided cell or in a corresponding group of cells.

The invention will be further described in connection with the accompanying drawing which illustrates one form of equipment appropriate for carrying out my invention. This equipment comprises a four-anode electrolytic cell shown in sectional plan in Fig. 1, and in sectional elevation in Fig. 2.

The illustrated cell comprises a vessel 3 subdivided to hold the several bodies of the magnesium chloride fusion and serving as the cathode with respect to each of these bodies made up of formed and welded steel plate, a series of four anodes 4, 5, 6 and 7, and a corresponding series of bells 8, 9, 10 and 11, made up of appropriate refractories. In the illustrated cell segregated bodies of the fusion are maintained in the several chambers 12, 13, 14 and 15. Apertures 16, 17 and 18 and connection 20 are provided for effecting circulation of the fusion from chamber 12 through chambers 13, 14 and 15 and back to chamber 12. Connection 21 is provided for introducing hydrous magnesium chloride, which may contain a small proportion of carbon into the space within the bell 8 above the body of fusion in chamber 12, and connections 22, 23, 24 and 25 are provided for taking off the gas mixtures collected in the several bells above the several bodies of the fusion. Connection 20 opens into bell 11 as indicated at 19 to utilize the levitating effect of chlorine liberated adjacent anode 7 for maintaining, or assisting in maintaining, circulation in the cycle comprising the several bodies of fusion.

In carrying out my invention in the illustrated cell: the several chambers in the cathode-vessel 3 are charged with a magnesium chloride fusion which may consist for example of about 10%–50% by weight of $MgCl_2$ and one or more of the chlorides of sodium, potassium and calcium. This fusion may also include other salts, such as sodium fluoride. This fusion may be maintained for example at a temperature of 700°–800° C. Appropriate direct current potential, about 6.0–8 volts for example, is impressed across the cathode and the several anodes collectively. As the electrolysis proceeds, liberating chlorine at the several anodes and magnesium which collects as molten metal on the surface of the fusion outside of the several bells, the make-up magnesium chloride required to replace that consumed in the electrolysis is introduced, for example, as the mono-hydrate or the dihydrate or some intermediate hydrate into the space within the bell 8 above the body of fusion in chamber 12 through connection 21. The hydrous salt is not introduced into the bells 9, 10 and 11. The hydrous salt is with advantage introduced into the bell 8 in the form of pellets having a density approximating that of the fused electrolyte and containing for example, about 1%–2% of free carbon. The hydrous salt is dehydrated as it is incorporating into the fusion within the bell 8. The fusion here is saturated with anodic chlorine liberated at the surface of the anode 4 and rising through the fusion to the space within the bell. This chlorine is sufficient to suppress substantial decomposition of the magnesium chloride thus undergoing dehydration. The gas mixture formed within bell 8 and taken off through connection 22 contains water vapor and hydrochloric acid and carbon dioxide. Some of the magnesium chloride thus incorporated into the fusion, sometimes as much as 5% or more, of the make-up magnesium chloride, is in the form of a basic magnesium chloride which reacts as the equivalent of water. Some of this basic magnesium chloride is decomposed in chamber 12, through reaction with liberated magnesium metal or with carbon of the anode or with carbon introduced with the make-up salt, but some remains as a basic magnesium chloride dissolved or suspended in the electrolyte circulating from chamber 12 to chamber 13. In chamber 13 the decomposition of such basic magnesium chloride is substantially complete. The decomposition of such basic magnesium chloride in chamber 13, however, liberates hydrochloric acid, in proportion less than that liberated in chamber 12, which appears as a contaminant of the chlorine taken off from bell 9 through connection 23. The fusion circulating through chambers 14 and 15 is thus substantially free from water or its equivalent and as a consequence a gas mixture consisting essentially of chlorine is taken off as such from bells 10 and 11 through connections 24 and 25. Thus, a substantial part of the chlorine initially liberated by the electrolysis is collected, separately, for direct recovery as such, a minor part of the chlorine is consumed in suppressing decomposition of the hydrous make-up magnesium chloride, and another minor but substantial part of the chlorine is collected, separately, contaminated with hydrochloric acid to but a limited extent. Any small proportion of magnesium oxide formed collects as mud in the bottom of the several chambers in the vessel 3. This mud is removed from time to time by conventional dredging. The magnesium metal liberated is removed from time to time through openings in the cell cover 26 opposite the several connections 22, 23, 24 and 25. These openings may also be used for dredging.

I claim:

In the electrolysis of magnesium chloride fusions to which magnesium chloride is supplied as a hydrous salt, the improvement which comprises subjecting at least three segregated bodies of the fusion to electrolysis, circulating the fusion cyclically through the several bodies, introducing the hydrous salt into the fusion in the presence of the anodic chlorine liberated by the electrolysis of one of the bodies and taking off a gas mixture containing water and hydrochloric acid from that body, taking off and separately collecting a gas mixture consisting essentially of chlorine from the body from which the fusion is circulating to the body into which the hydrous salt is introduced, and taking off a gas mixture containing less hydrochloric acid than the first mentioned gas mixture from a body in the cycle of circulation of the fusion between the two bodies first individually mentioned.

WILLIAM C. GARDINER.